US012154538B2

(12) United States Patent
Liu et al.

(10) Patent No.: US 12,154,538 B2
(45) Date of Patent: Nov. 26, 2024

(54) METHOD AND APPARATUS FOR ELIMINATING SOUND LEAKAGE

(71) Applicant: AAC ACOUSTIC TECHNOLOGIES (SHENZHEN) CO., LTD., Shenzhen (CN)

(72) Inventors: Kejia Liu, Shenzhen (CN); Yuheng Jiang, Shenzhen (CN); Wenkai He, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 99 days.

(21) Appl. No.: 18/088,641

(22) Filed: Dec. 26, 2022

(65) Prior Publication Data

US 2024/0087555 A1 Mar. 14, 2024

Related U.S. Application Data

(63) Continuation of application No. PCT/CN2022/129413, filed on Nov. 3, 2022.

(30) Foreign Application Priority Data

Sep. 9, 2022 (CN) ......................... 202211103742.8

(51) Int. Cl.
*G10K 11/178* (2006.01)

(52) U.S. Cl.
CPC .... *G10K 11/1785* (2018.01); *G10K 11/17821* (2018.01); *G10K 2210/108* (2013.01); *G10K 2210/3014* (2013.01); *G10K 2210/3016* (2013.01)

(58) Field of Classification Search
CPC ........ H04R 3/04; H04R 2460/01; H04R 1/32; G10K 11/175; G10K 11/178; G10K 11/1752; G10K 11/1785; G10K 11/17821; G10K 2210/108; G10K 2210/3014; G10K 2210/3016
USPC ....... 381/58, 71.1, 73.1, 97, 56; 379/202.01; 455/416
See application file for complete search history.

(56) References Cited

FOREIGN PATENT DOCUMENTS

| | | | |
|---|---|---|---|
| CN | 111212364 | * | 5/2020 |
| CN | 113746975 | * | 12/2021 |

* cited by examiner

*Primary Examiner* — Norman Yu
(74) *Attorney, Agent, or Firm* — W&G Law Group

(57) ABSTRACT

A method for eliminating sound leakage includes: controlling, upon detecting call voice being outputted by a receiver, a collection device to determine a first frequency response curve of first sound wave of the call voice at a first position outside a terminal device; controlling a speaker to generate a second sound wave; controlling the collection device to determine a second frequency response curve of the second sound wave at the first position; and regulating, according to the first frequency response curve, the second frequency response curve to a third frequency response curve. Frequency responses of the first and third frequency response curves at a corresponding frequency are superimposed on and cancel each other. The speaker actively generates second sound wave that is modulated according to a parameter of first sound wave, so as to ensure that second sound wave effectively eliminates leakage of call content caused by first sound wave.

8 Claims, 5 Drawing Sheets

METHOD AND APPARATUS FOR ELIMINATING SOUND LEAKAGE

TECHNICAL FIELD

The present application relates to the field of terminal devices, and in particular, to a method for eliminating sound leakage and an apparatus for eliminating sound leakage.

BACKGROUND

With the improvement of consumers' privacy awareness, privacy of calls is becoming more and more important to the consumers. During a call, sound may be leaked due to an excessively large power amplifier of a receiver. As a result, users' call content may be leaked. Sound leakage of a terminal device during a call is generally represented by an isolation degree. The better the isolation degree of the terminal device is, the less the sound leakage of the receiver during the call.

During the call, the isolation degree of the call is represented through a difference between sensitivity of the receiver at a human ear and sensitivity of a specific location on the back of the terminal device. The greater the difference between the sensitivity of the two, the better the isolation degree. In the related art, the terminal device improves the isolation degree generally by using a hardware structure, that is, by changing a position of the receiver or a shape of a narrow slit. However, a sound insulation effect is poor, and the sound leakage cannot be completely eliminated.

SUMMARY

In view of the above, embodiments of the present disclosure provide a method for eliminating sound leakage and an apparatus for eliminating sound leakage, in which a speaker mounted on a first device actively transmits a sound signal with a phase opposite to a phase of call sound leakage to generate a certain degree of cancellation when the call sound leakage is transmitted to a location of others, so as to eliminate the call sound leakage.

In a first aspect, some embodiments of the present disclosure provide a method for eliminating sound leakage. The method includes: controlling, upon detecting that call voice is outputted by a receiver, a collection device to determine a first frequency response curve of a first sound wave generated by the call voice at a first position outside a terminal device; controlling a speaker to generate a second sound wave; controlling the collection device to determine a second frequency response curve of the second sound wave at the first position; and regulating, according to the first frequency response curve, the second frequency response curve generated by the second sound wave at the first position to a third frequency response curve, frequency response of the third frequency response curve being superimposed on and canceling frequency response of the first frequency response curve at a corresponding frequency.

As an improvement, the controlling the collection device to determine the first frequency response curve of the first sound wave generated by the call voice at the first position outside the terminal device includes: transmitting a collection instruction to the collection device, the collection instruction being used to trigger the collection device to start collecting the first frequency response curve of the first sound wave at the first position.

As an improvement, the regulating, according to the first frequency response curve, the second frequency response curve generated by the second sound wave at the first position to the third frequency response curve includes: performing equalizer (EQ) modulation on the second frequency response curve of the second sound wave at the first position, where a difference between a frequency response value of the second frequency response curve after the EQ modulation at each frequency and a frequency response value of the first frequency response curve at the frequency is greater than a first threshold that is preset, and the difference is also smaller than a second threshold that is preset; regulating an input voltage of the speaker to obtain another second frequency response curve, wherein the another second frequency response curve is obtained by setting a frequency response value of the second frequency response curve after the EQ modulation at each frequency so that a difference between the frequency response value and a frequency response value of the first frequency response curve at the frequency is smaller than a third threshold that is preset; and determining the another second frequency response curve as the third frequency response curve.

As an improvement, the second frequency response curve after the EQ modulation has a phase opposite to a phase of the first frequency response curve at each frequency.

As an improvement, the third frequency response curve has a frequency response value corresponding to each frequency, wherein the frequency response value is smaller than a frequency response value of the first frequency response curve corresponding to the frequency, or is smaller than a fourth threshold that is preset.

In a second aspect, some embodiments of the present disclosure provide an apparatus for eliminating sound leakage. The apparatus includes: a first control module, configured to control, upon detecting that call voice is outputted by a receiver, a collection device to determine a first frequency response curve of a first sound wave generated by the call voice at a first position outside a terminal device; a second control module, configured to control a speaker to generate a second sound wave; a third control module, configured to control the collection device to determine a second frequency response curve of the second sound wave at the first position; and a regulation module, configured to regulate, according to the first frequency response curve, the second frequency response curve generated by the second sound wave at the first position to a third frequency response curve, frequency response of the third frequency response curve being superimposed on and canceling frequency response of the first frequency response curve at a corresponding frequency.

As an improvement, the regulation module includes an equalizer (EQ) modulation module and a voltage regulation module. The EQ modulation module is configured to perform EQ modulation on the second frequency response curve of the second sound wave at the first position, wherein a difference between a frequency response value of the second frequency response curve after the EQ modulation at each frequency and a frequency response value of the first frequency response curve at the frequency is greater than a first threshold that is preset, and is smaller than a second threshold that is preset. The voltage regulation module is configured to regulate an input voltage of the speaker to obtain another second frequency response curve, wherein the another second frequency response curve is obtained by setting a frequency response value of the second frequency response curve after the EQ modulation at each frequency so that a difference between the frequency response value and a frequency response value of the first frequency response curve at the frequency is smaller than a third threshold that is preset. The voltage regulation module is also configured to determine the another second frequency response curve as the third frequency response curve.

As an improvement, the EQ modulation module is further configured to modulate a phase of the second frequency response curve at each frequency to a phase opposite to a phase of the first frequency response curve.

In a third aspect, some embodiments of the present disclosure provide a device for eliminating sound leakage. The device includes at least one processor and at least one memory in communication with and connected to the at least one processor. The at least one memory stores program instructions executable by the processor. When executed by the at least one processor, the program instructions cause the at least one processor to perform a method for eliminating sound leakage. The method includes: controlling, upon detecting that call voice is outputted by a receiver, a collection device to determine a first frequency response curve of a first sound wave generated by the call voice at a first position outside a terminal device; controlling a speaker to generate a second sound wave; controlling the collection device to determine a second frequency response curve of the second sound wave at the first position; and regulating, according to the first frequency response curve, the second frequency response curve generated by the second sound wave at the first position to a third frequency response curve, frequency response of the third frequency response curve being superimposed on and canceling frequency response of the first frequency response curve at a corresponding frequency.

As an improvement, the controlling the collection device to determine the first frequency response curve of the first sound wave generated by the call voice at the first position outside the terminal device includes: transmitting a collection instruction to the collection device, the collection instruction being used to trigger the collection device to start collecting the first frequency response curve of the first sound wave at the first position.

As an improvement, the regulating, according to the first frequency response curve, the second frequency response curve generated by the second sound wave at the first position to the third frequency response curve includes: performing equalizer (EQ) modulation on the second frequency response curve of the second sound wave at the first position, where a difference between a frequency response value of the second frequency response curve after the EQ modulation at each frequency and a frequency response value of the first frequency response curve at the frequency is greater than a first threshold that is preset, and the difference is also smaller than a second threshold that is preset; regulating an input voltage of the speaker to obtain another second frequency response curve, wherein the another second frequency response curve is obtained by setting a frequency response value of the second frequency response curve after the EQ modulation at each frequency so that a difference between the frequency response value and a frequency response value of the first frequency response curve at the frequency is smaller than a third threshold that is preset; and determining the another second frequency response curve as the third frequency response curve.

As an improvement, the second frequency response curve after the EQ modulation has a phase opposite to a phase of the first frequency response curve at each frequency.

As an improvement, the third frequency response curve has a frequency response value corresponding to each frequency, wherein the frequency response value is smaller than a frequency response value of the first frequency response curve corresponding to the frequency, or is smaller than a fourth threshold that is preset.

In a fourth aspect, some embodiments of the present disclosure provide a device for eliminating sound leakage. The device includes a terminal device and a collection device. The terminal device includes a receiver, a speaker, and a control component. The control component is in communication with and connected to the collection device. The control component is configured to perform a method for eliminating sound leakage. The method includes: controlling, upon detecting that call voice is outputted by a receiver, a collection device to determine a first frequency response curve of a first sound wave generated by the call voice at a first position outside a terminal device; controlling a speaker to generate a second sound wave; controlling the collection device to determine a second frequency response curve of the second sound wave at the first position; and regulating, according to the first frequency response curve, the second frequency response curve generated by the second sound wave at the first position to a third frequency response curve, frequency response of the third frequency response curve being superimposed on and canceling frequency response of the first frequency response curve at a corresponding frequency.

As an improvement, the controlling the collection device to determine the first frequency response curve of the first sound wave generated by the call voice at the first position outside the terminal device includes: transmitting a collection instruction to the collection device, the collection instruction being used to trigger the collection device to start collecting the first frequency response curve of the first sound wave at the first position.

As an improvement, the regulating, according to the first frequency response curve, the second frequency response curve generated by the second sound wave at the first position to the third frequency response curve includes: performing equalizer (EQ) modulation on the second frequency response curve of the second sound wave at the first position, where a difference between a frequency response value of the second frequency response curve after the EQ modulation at each frequency and a frequency response value of the first frequency response curve at the frequency is greater than a first threshold that is preset, and the difference is also smaller than a second threshold that is preset; regulating an input voltage of the speaker to obtain another second frequency response curve, wherein the another second frequency response curve is obtained by setting a frequency response value of the second frequency response curve after the EQ modulation at each frequency so that a difference between the frequency response value and a frequency response value of the first frequency response curve at the frequency is smaller than a third threshold that is preset; and determining the another second frequency response curve as the third frequency response curve.

As an improvement, the second frequency response curve after the EQ modulation has a phase opposite to a phase of the first frequency response curve at each frequency.

As an improvement, the third frequency response curve has a frequency response value corresponding to each frequency, wherein the frequency response value is smaller than a frequency response value of the first frequency response curve corresponding to the frequency, or is smaller than a fourth threshold that is preset.

In the above solution, the speaker actively generates the second sound wave, and the second sound wave is modulated according to a parameter of the first sound wave, so as to ensure that the second sound wave can more effectively eliminate the problem of leakage of call content caused by the first sound wave.

BRIEF DESCRIPTION OF DRAWINGS

In order to more clearly illustrate the technical solutions in the embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art from the provided drawings without creative efforts.

DESCRIPTION OF EMBODIMENTS

In order to better understand the technical solution of the present disclosure, the embodiments of the present disclosure are described in detail below with reference to the accompanying drawings.

It should be clear that the embodiments described are only some rather than all of the embodiments of the present disclosure. All other embodiments acquired by those of ordinary skill in the art based on the embodiments in the present disclosure fall within the protection scope of the present disclosure.

In order to solve the problem of sound leakage of calls, in the embodiments of the present disclosure, when a terminal device makes a call, a speaker mounted on the terminal device actively generates a sound wave which is superimposed on and cancels a sound wave generated by sound leakage of the receiver, so as to achieve an effect of reducing and eliminating the sound leakage of the receiver.

Figure 1:
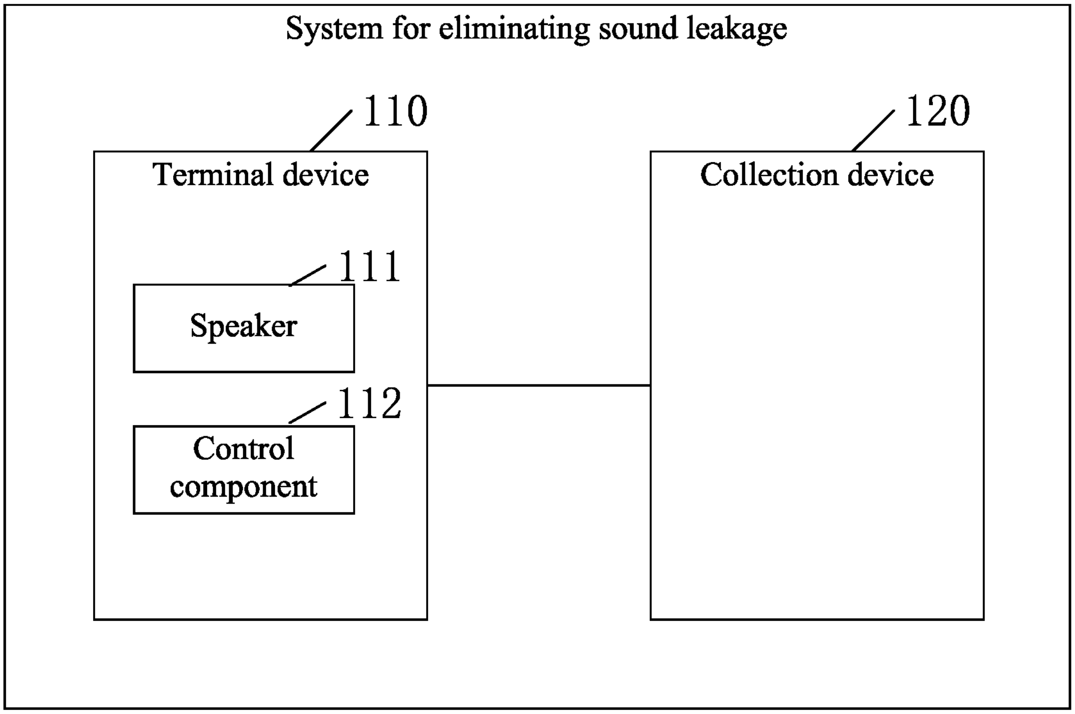
FIG. 1 is a schematic diagram of a system for eliminating sound leakage according to an embodiment of the present disclosure.
Figure 2:
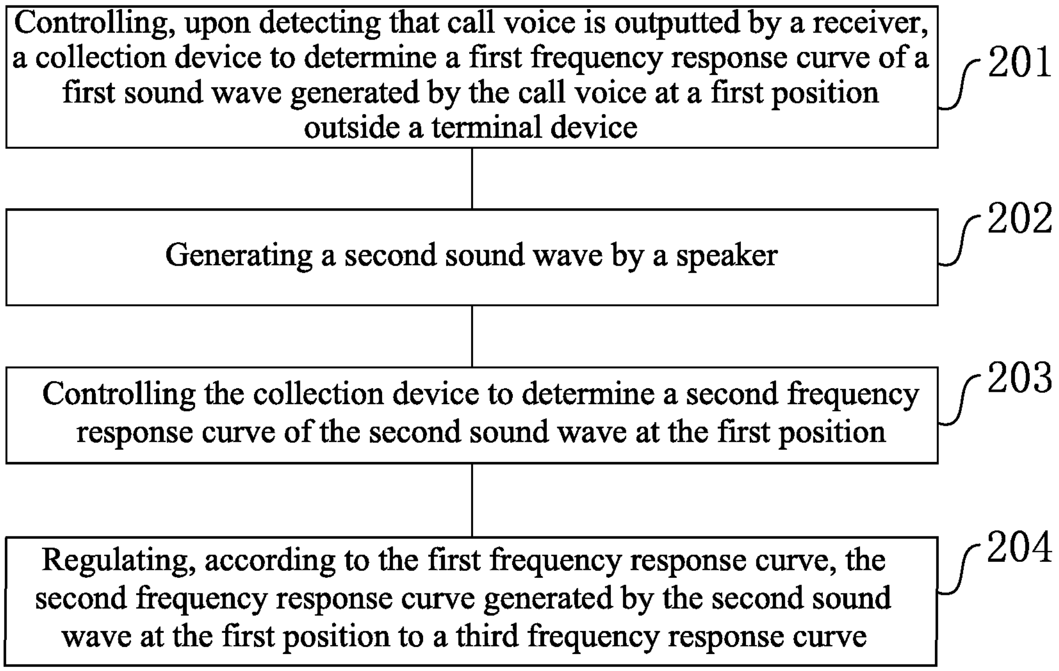
FIG. 2 is a flow chart of a method for eliminating sound leakage according to an embodiment of the present disclosure.

In order to eliminate sound leakage of the terminal device, an embodiment of the present disclosure firstly provides a system for eliminating sound leakage. As shown in FIG. 1, the system for eliminating sound leakage includes a terminal device 110 and a collection device 120. A speaker 111 and a control component 112 are provided in the terminal device 110.

The terminal device 110 is configured to generate a first sound wave and a second sound wave when outputting call voice. The first sound wave is a sound wave leaked by a receiver when a user makes a call through the receiver. The second sound wave is actively generated by the speaker 111 mounted on the terminal device 110 and controlled by the terminal device through the control component 112, and is used to cancel the first sound wave. In some embodiments, two or more speakers may also be mounted on the terminal device.

The receiver is arranged on the terminal device and configured to output call voice when a user makes a call.

The collection device 120 is arranged at a first position outside the terminal device 110 and is in communication with and connected to the terminal device 110. The collection device 120 is configured to, when the terminal device 110 makes a voice call, collect a first frequency response curve of the first sound wave at the first position and a second frequency response curve of the second sound wave at the first position, and feed the first frequency response curve and the second frequency response curve to the terminal device through the communication connection with the terminal device 110.

The control component 112 arranged in the terminal device 110 modulates the second frequency response curve of the second sound wave to a third frequency response curve according to parameters in the frequency response curves fed back by the collection device 120, that is, the second sound wave is modulated to a sound wave that can be superimposed on and cancel the first sound wave, so as to eliminate sound leakage.

In conjunction with the system for eliminating sound leakage shown in FIG. 1, some embodiments of the present disclosure further provide a method for eliminating sound leakage. The method is applied to a control component 112 arranged in the terminal device 110. As shown in FIG. 1, the method includes the steps 201, 202, 203, and 204.

At step 201, upon detecting that call voice is outputted by a receiver, a collection device determines a first frequency response curve of a first sound wave generated by the call voice at a first position outside a terminal device.

When the first sound wave generated by the call voice outputted by the receiver is transmitted to the first position, the first frequency response curve of the first sound wave is determined by the collection device arranged at the first position. In some embodiments, the collection device may be a microphone.

A collection instruction is transmitted to the collection device to instruct the collection device to determine, at the first position where the collection device is arranged, a first frequency response curve of a first sound wave generated by sound leakage of the receiver at the first position, and to instruct the collection device to feed the determined first frequency response curve to the control component of the terminal device.

The first frequency response curve is a curve representing a corresponding relationship between frequencies and frequency response of the first sound wave at the first position.

At step 202, a speaker is controlled to generate a second sound wave.

When it is detected that the receiver is outputting call voice, that is, the user is making a voice call with a peer end through the terminal device, the speaker actively generates the second sound wave used to be superimposed on and canceling the first sound wave.

At step 203, the collection device is controlled to determine a second frequency response curve of the second sound wave at the first position.

When the second sound wave outputted by the speaker is transmitted to the first position, the collection device arranged at the first position may also determine the second frequency response curve of the second sound wave according to the collection instruction. The second frequency response curve is used to determine frequency response values corresponding to the second sound wave at different frequencies at the first position.

At step 204, the second frequency response curve generated by the second sound wave at the first position is regulated to a third frequency response curve according to the first frequency response curve.

The second sound wave is modulated and the speaker producing the second sound wave is regulated to regulate the second frequency response curve of the second sound wave at the first position to the third frequency response curve. A frequency response value of the third frequency response curve at each frequency is almost identical with a frequency response value of the first frequency response curve at the corresponding frequency, and the third frequency response curve and the first frequency response curve have opposite phases at the corresponding frequency, so as to be effectively superimposed on and cancel the first sound wave.

Firstly, EQ modulation is performed on the second frequency response curve of the second sound wave at the first position to regulate the second frequency response curve to a frequency response curve with a same trend as the first frequency response curve.

With the EQ modulation, frequency response values at various frequencies in the second frequency response curve are regulated, so that differences between the frequency response values in the second frequency response curve and the frequency response values in the first frequency response curve at various frequencies are all greater than a first threshold and smaller than a second threshold. That is, differences between the first frequency response curve and the second frequency response curve at various frequencies are all within a fixed range.

Figure 3:
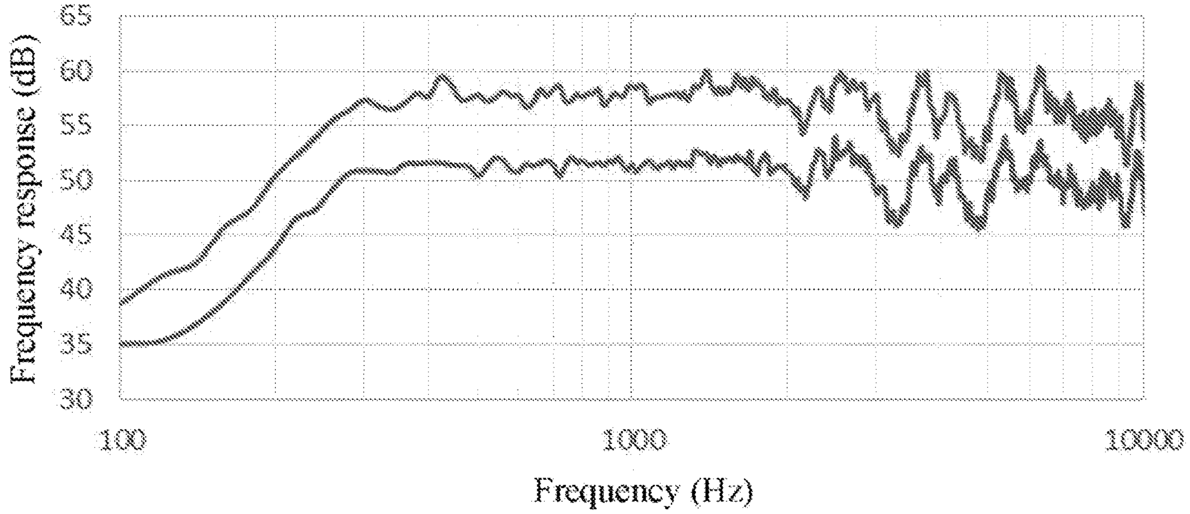
FIG. 3 shows an image of a frequency response curve according to an embodiment of the present disclosure.

FIG. 3 is a schematic diagram of a frequency response curve according to an embodiment of the present disclosure. Referring to FIG. 3, the second frequency response curve after the EQ modulation has a same trend as the first frequency response curve. That is, the difference between corresponding frequency response values at each frequency is within a fixed range. In some embodiments, the first frequency response curve and the second frequency response curve have a same shape.

After performing the EQ modulation on the second frequency response curve, an input voltage of the speaker is regulated to obtain another second frequency response curve, and the another second frequency response curve is obtained by setting a frequency response value of the second frequency response curve after the EQ modulation at each frequency so that a difference between this frequency response value and a frequency response value of the first frequency response curve at the frequency is smaller than a third threshold. That is, the frequency response values of the second frequency response curve at various frequencies all approach the frequency response values of the first frequency response curve at these frequencies, respectively.

The another second frequency response curve is determined as the third frequency response curve. A parameter of the second sound wave reflected in the third frequency response curve is almost identical with a parameter of the first sound wave, and the second sound wave reflected in the third frequency response curve and the first sound wave have opposite phases, so that the first sound wave can be effectively eliminated.

In this embodiment of the present disclosure, the speaker actively generates the second sound wave, and the second sound wave is modulated according to the parameter of the first sound wave, so as to ensure that the second sound wave can more effectively eliminate the problem of leakage of call content caused by the first sound wave.

In some embodiments, in order to ensure that the second sound wave can cancel the first sound wave instead of increasing the first sound wave in reverse, it can be ensured that the frequency response values in the third frequency response curve satisfy a preset condition all the time during the regulation of the second sound wave.

The frequency response value corresponding to the third frequency response curve at any frequency is smaller than the frequency response value corresponding to the first frequency response curve at the frequency.

A cancellation effect can be generated at the corresponding frequency only when the frequency response value in the third frequency response curve is smaller than the frequency response value in the first frequency response curve. However, once the frequency response value in the third frequency response curve is greater than the frequency response value in the first frequency response curve, the first sound wave may be enhanced in reverse.

In some embodiments, a fourth threshold may also be preset, and the frequency response value in the third frequency response curve is kept smaller than the fourth threshold. Under frequency response values specified by the fourth threshold, even if the second sound wave slightly enhances the first sound wave, other people cannot hear the call content. In this case, it may also be regarded that the method for eliminating sound leakage works. Generally, the fourth threshold is 20 dB.

In some embodiments, several different first positions may be pre-selected, first frequency response curves of the first sound wave at the first positions are measured respectively, and parameters of the second sound wave corresponding thereto are determined. The parameters of the second sound wave for eliminating sound leakage at the different first positions are stored respectively. When the terminal device makes an actual call, the pre-stored parameters may be directly called to regulate the second sound wave, without the need to perform collection and calculation again through the collection device.

Figure 4:
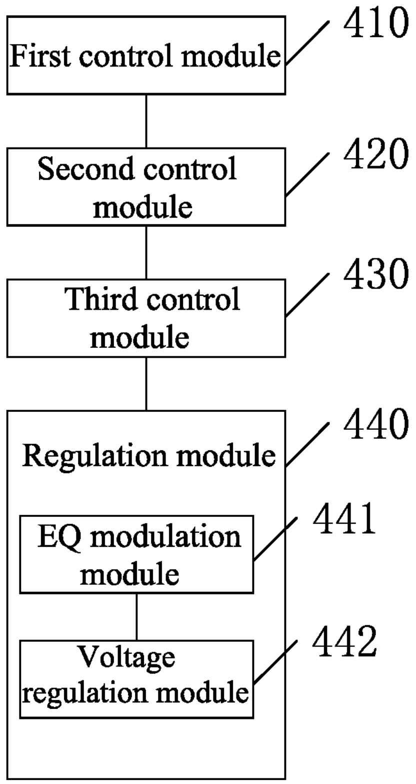
FIG. 4 is a schematic diagram of an apparatus for eliminating sound leakage according to an embodiment of the present disclosure.

Corresponding to the method for eliminating sound leakage, an embodiment of the present disclosure further provides an apparatus for eliminating sound leakage. Referring to FIG. 4 which is a schematic diagram of an apparatus for eliminating sound leakage according to embodiments of the present disclosure. As shown in FIG. 4, the apparatus may include: a first control module 410, a second control module 420, a third control module 430, and a regulation module 340.

The first control module 410 is configured to control, upon detecting that call voice is outputted by a receiver, a collection device to determine a first frequency response curve of a first sound wave generated by the call voice at a first position outside a terminal device.

The second control module 420 is configured to control a speaker to generate a second sound wave.

The third control module 430 is configured to control the collection device to determine a second frequency response curve of the second sound wave at the first position.

The regulation module 440 is configured to regulate, according to the first frequency response curve, the second frequency response curve generated by the second sound wave at the first position to a third frequency response curve, frequency response of the third frequency response curve being superimposed on and canceling frequency response of the first frequency response curve at a corresponding frequency.

The regulation module specifically includes an EQ modulation module 441 and a voltage regulation module 442.

The EQ modulation module 441 performs EQ modulation on the second frequency response curve of the second sound wave at the first position, and a difference between a frequency response value of the modulated second frequency response curve at any frequency and a frequency response value of the first frequency response curve at the frequency is greater than a first threshold that is preset, and the difference is also smaller than a second threshold that is preset.

The voltage regulation module 442 regulates an input voltage of the speaker to obtain another second frequency response curve, where the another second frequency response curve is obtained by setting a frequency response value of the second frequency response curve after the EQ modulation at each frequency so that a difference between this frequency response value and a frequency response value of the first frequency response curve at the frequency is smaller than a third threshold that is preset. The voltage regulation module 442 determines the another second frequency response curve as the third frequency response curve.

The apparatus for eliminating sound leakage according to the embodiment shown in FIG. 4 may be configured to perform the technical solution of the method embodiment shown in the specification. An implementation principle and a technical effect thereof can be obtained with further reference to the related descriptions in the method embodiment.

Figure 5:
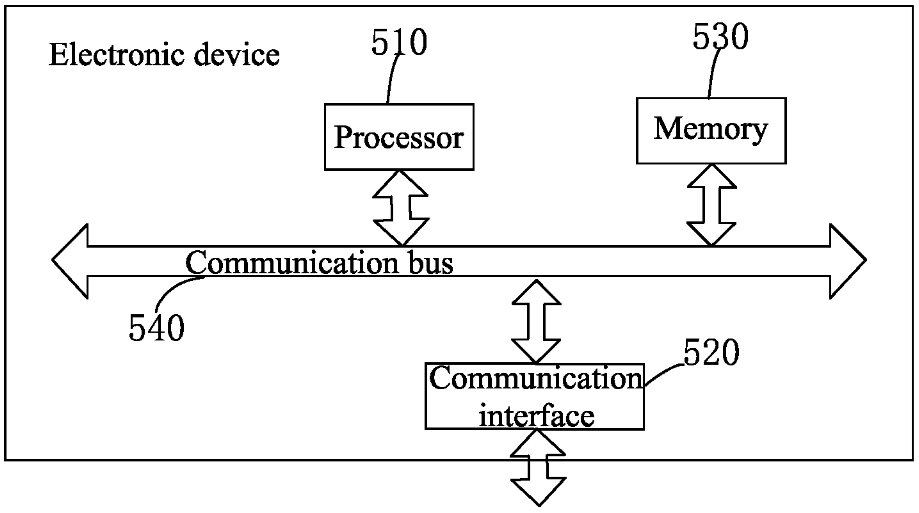
FIG. 5 is a schematic diagram of an electronic device according to an embodiment of the present disclosure.

FIG. 5 is a schematic diagram of an embodiment of an electronic device in the specification. The electronic device may be implemented as a device for eliminating sound leakage including a terminal device and a collection device. As shown in FIG. 5, the device for eliminating sound leakage may include at least one processor and at least one memory in communication with and connected to the processor. The memory stores program instructions executable by the processor, and when executed by the processor, the program instructions cause the processor to perform the method for eliminating sound leakage according to the embodiments.

The device for eliminating sound leakage may be a device that can make an intelligent conversation with a user. The specific form of the device for eliminating sound leakage is not limited in the embodiments of the specification. It may be understood that the device for eliminating sound leakage herein is the machine mentioned in the method embodiment.

FIG. 5 is a block diagram of an example device for eliminating sound leakage suitable for implementing the embodiments of the specification. The device for eliminating sound leakage shown in FIG. 5 is only an example, which should not limit the function and the application scope of the embodiments of the specification.

As shown in FIG. 5, the device for eliminating sound leakage is represented in the form of a general computing device. Components of the device for eliminating sound leakage may include, but are not limited to, at least one processor 510, a communication interface 520, a memory 530, and a communication bus 540 connecting different system components (including the memory 530, the communication interface 520, and the processor 510).

The communication bus 540 represents one or more of several types of bus structures, including a memory bus or memory controller, a peripheral bus, an accelerated graphics port, and a processor or a local bus using any of a variety of bus structures. For example, such architectures include, but are not limited to, an industry standard architecture (ISA) bus, a micro channel architecture (MCA) bus, an enhanced ISA (EISA) bus, a video electronics standards association (VESA) local bus, and a peripheral component interconnection (PCI) bus.

The device for eliminating sound leakage typically includes a variety of computer system readable media. Such media may be any available media that is accessible by the device for eliminating sound leakage, including volatile and non-volatile media and removable and non-removable media.

The memory 530 may include computer system readable media in the form of a volatile memory, such as a random access memory (RAM) and/or a cache memory. The device for eliminating sound leakage may further include other removable/non-removable, volatile/non-volatile computer system storage media. The memory 530 may include at least one program product. The program product has a set (e.g., at least one) of program modules. The program modules are configured to perform the functions of the embodiments in the specification.

Program/utility, having a set (at least one) of program modules, may be stored in the memory 530. Such program modules include, but are not limited to, an operating system, one or more application programs, other program modules, and program data. Each of the examples or a combination thereof may include an implementation of a network environment. The program modules generally perform the functions and/or methods in the embodiments described in the specification.

The processor 510 performs the program stored in the memory 530 so as to execute various functional applications and data processing, for example, implement the method for eliminating sound leakage according to the embodiments in the specification.

An embodiment of the specification provides a non-transitory computer-readable storage medium. The non-transitory computer-readable storage medium stores computer instructions. The computer instructions cause the computer to perform the method for eliminating sound leakage according to the embodiments in the specification.

The non-transitory computer-readable storage medium may be any combination of one or more computer-readable mediums. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any suitable combination thereof. More specific examples (a non-exhaustive list) of the computer-readable storage medium include: an electrical connection having one or more wires, a portable computer diskette, a hard disk, a random access memory (RAM), a read only memory (ROM), an erasable programmable read-only memory (EPROM) or a flash memory, an optical fiber, a portable compact disc read only memory (CD-ROM), an optical storage device, a magnetic storage device, or any suitable combination thereof. In the text herein, the computer-readable storage medium may be any tangible medium that includes or stores a program. The program may be used by or in conjunction with an instruction execution system, apparatus, or device.

The computer-readable signal medium may include a data signal propagated in a baseband or as part of a carrier wave, in which computer-readable program code is carried. The data signal propagated in this manner may take a variety of forms, including, but not limited to, an electromagnetic signal, an optical signal, or any suitable combination thereof. The computer-readable signal medium may also be any computer-readable medium other than the computer-readable storage medium. The computer-readable medium can send, propagate, or transmit a program for use by or in conjunction with an instruction execution system, apparatus, or device.

The program code embodied on the computer-readable medium may be transmitted using any appropriate medium, including but not limited to, radio, electric wire, optical cable, RF or the like, or any suitable combination thereof.

Computer program code for performing operations in the specification may be written in one or more programming languages or any combination thereof. The programming languages include an object oriented programming language such as Java, Smalltalk, C++ or the like, and further include conventional procedural programming languages, such as the "C" programming language or similar programming languages. The program code may be executed entirely on a user computer, partly on the user computer, as a stand-alone software package, partly on the user computer and partly on a remote computer, or entirely on the remote computer or a server. In the situation where the remote computer is involved, the remote computer may be connected to the user computer through any type of network, including a local area network (LAN) or a wide area network (WAN), or connected to an external computer (for example, through the Internet by using an Internet service provider).

Particular embodiments of the specification are described above. Other embodiments fall within the scope of the appended claims. In some situations, the actions or steps described in the claims can be performed in a sequence different from the sequence in the embodiment and the desired results can still be achieved. In addition, the process depicted in the accompanying drawings does not necessarily require a particular order or sequential order to achieve the desired results. In some embodiments, multi-tasking and parallel processing are also possible or may be advantageous.

In addition, the terms "first" and "second" are used for descriptive purposes only, which cannot be construed as indicating or implying a relative importance, or implicitly specifying the number of the indicated technical features. Thus, the features defined with "first" and "second" may explicitly or implicitly include one or more features. In the description of the specification, "a plurality of" means two or more, for example, two, three, or the like, unless specifically stated otherwise.

The description of any process or method in the flowcharts or described herein in other manners may be understood as representing a module, a segment or a part that includes one or more codes of executable instructions for implementing the steps of a customized logic function or process, and the scope of preferred embodiments of the specification include other implementations. The functions may be executed in a basically simultaneous manner or an opposite order according to the related functions instead of the shown or described order. This should be understood by those skilled in the art to which the embodiments of the specification belong.

Depending on the context, the wording "if" used herein may be interpreted as "when", or "once", or "in response to a determination" or "in response to detection". Similarly, depending on the context, the phrase "if it is determined that" or "if (a described condition or event) is detected" may be interpreted as "once it is determined that", or "in response to a determination", or "once (a described condition or event) is detected", or "in response to a case where (a described condition or event) is detected".

It is to be noted that the terminal as referred to in the embodiments of the specification may include, but is not limited to, a personal computer (PC), a personal digital assistant (PDA), a wireless hand-held device, a tablet computer, a mobile phone, an MP3 player, an MP4 player, and the like.

In the embodiments provided in the specification, it should be understood that the disclosed system, apparatus, and method may be implemented in other manners. For example, the described apparatus embodiment is merely an example. For example, the division of units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, functional units in the embodiments of the specification may be integrated into one processing unit, or each of the units may exist alone physically, or two or more units are integrated into one unit. The integrated unit may be implemented in a form of hardware or in a form of hardware plus a software function unit.

The integrated unit implemented in the form of the software function unit may be stored in a computer-readable storage medium. The software function unit is stored in a storage medium, and includes several instructions for instructing a computer device (which may be a personal computer, a server, a network device, or the like) or a processor to perform all or some of the steps of the methods described in the embodiments of the specification.

The foregoing descriptions are merely some embodiments of the specification, but are not intended to limit the specification. Any modification, equivalent replacement, improvement, and the like made within the principle of the specification shall fall within the protection scope of the specification.

What is claimed is:

1. A method for eliminating sound leakage, comprising:

controlling, upon detecting that call voice is outputted by a receiver, a collection device to determine a first frequency response curve of a first sound wave generated by the call voice at a first position outside a terminal device;

controlling a speaker to generate a second sound wave;

controlling the collection device to determine a second frequency response curve of the second sound wave at the first position; and regulating, according to the first frequency response curve, the second frequency response curve generated by the second sound wave at the first position to determine it to a third frequency response curve, frequency response of the third frequency response curve being superimposed on and canceling frequency response of the first frequency response curve at a corresponding frequency;

wherein the regulating, according to the first frequency response curve, the second frequency response curve generated by the second sound wave at the first position to the third frequency response curve comprises:

performing equalizer, EQ, modulation on the second frequency response curve of the second sound wave at the first position, wherein a difference between a frequency response value of the second frequency response curve after the EQ modulation at each frequency and a frequency response value of the first frequency response curve at the frequency is greater than a first threshold that is preset, and the difference is also smaller than a second threshold that is preset;

regulating an input voltage of the speaker to obtain another second frequency response curve, wherein the another second frequency response curve is obtained by setting a frequency response value of the second frequency response curve after the EQ modulation at each frequency so that a difference between the frequency response value and a frequency response value of the first frequency response curve at the frequency is smaller than a third threshold that is preset; and determining the another second frequency response curve as the third frequency response curve.

2. The method as described in claim 1, wherein the controlling the collection device to determine the first frequency response curve of the first sound wave generated by the call voice at the first position outside the terminal device comprises:

transmitting a collection instruction to the collection device, the collection instruction being used to trigger the collection device to start collecting the first frequency response curve of the first sound wave at the first position.

3. The method as described in claim 1, wherein the second frequency response curve after the EQ modulation has a phase opposite to a phase of the first frequency response curve at each frequency.

4. The method as described in claim 1, wherein the third frequency response curve has a frequency response value corresponding to each frequency, wherein the frequency response value is smaller than a frequency response value of the first frequency response curve corresponding to the frequency, or is smaller than a fourth threshold that is preset.

5. A device for eliminating sound leakage, comprising:

at least one processor; and at least one memory in communication with and connected to the at least one processor, wherein the at least one memory stores program instructions executable by the processor, and when executed by the at least one processor, the program instructions cause the at least one processor to perform a method for eliminating sound leakage, wherein the method for eliminating sound leakage comprises:

controlling, upon detecting that call voice is outputted by a receiver, a collection device to determine a first frequency response curve of a first sound wave generated by the call voice at a first position outside a terminal device;

controlling a speaker to generate a second sound wave;

controlling the collection device to determine a second frequency response curve of the second sound wave at the first position; and regulating, according to the first frequency response curve, the second frequency response curve generated by the second sound wave at the first position to determine it to a third frequency response curve, frequency response of the third frequency response curve being superimposed on and canceling frequency response of the first frequency response curve at a corresponding frequency;

wherein the regulating, according to the first frequency response curve, the second frequency response curve of the second sound wave at the first position to the third frequency response curve comprises:

performing equalizer, EQ, modulation on the second frequency response curve of the second sound wave at the first position, wherein a difference between a frequency response value of the second frequency response curve after the EQ modulation at each frequency and a frequency response value of the first frequency response curve at the frequency is greater than a first threshold that is preset, and the difference is also smaller than a second threshold that is preset;

regulating an input voltage of the speaker to obtain another second frequency response curve, wherein the another second frequency response curve is obtained by setting a frequency response value of the second frequency response curve after the EQ modulation at each frequency so that a difference between the frequency response value and a frequency response value of the first frequency response curve at the frequency is smaller than a third threshold that is preset; and determining the another second frequency response curve as the third frequency response curve.

6. The device as described in claim 5, wherein the controlling the collection device to determine the first frequency response curve of the first sound wave generated by the call voice at the first position outside the terminal device comprises:

transmitting a collection instruction to the collection device, the collection instruction being used to trigger the collection device to start collecting the first frequency response curve of the first sound wave at the first position.

7. The device as described in claim 5, wherein the second frequency response curve after the EQ modulation has a phase opposite to a phase of the first frequency response curve at each frequency.

8. The device as described in claim 5, wherein the third frequency response curve has a frequency response value corresponding to each frequency, wherein the frequency response value is smaller than a frequency response value of the first frequency response curve corresponding to the frequency, or is smaller than a fourth threshold that is preset.

* * * * *